Sept. 6, 1949.　　　　　L. R. BUCKENDALE　　　　　2,480,833
　　　　　　　　　　　　　　AXLE HOUSING
Filed Sept. 2, 1944　　　　　　　　　　　　　　3 Sheets-Sheet 1
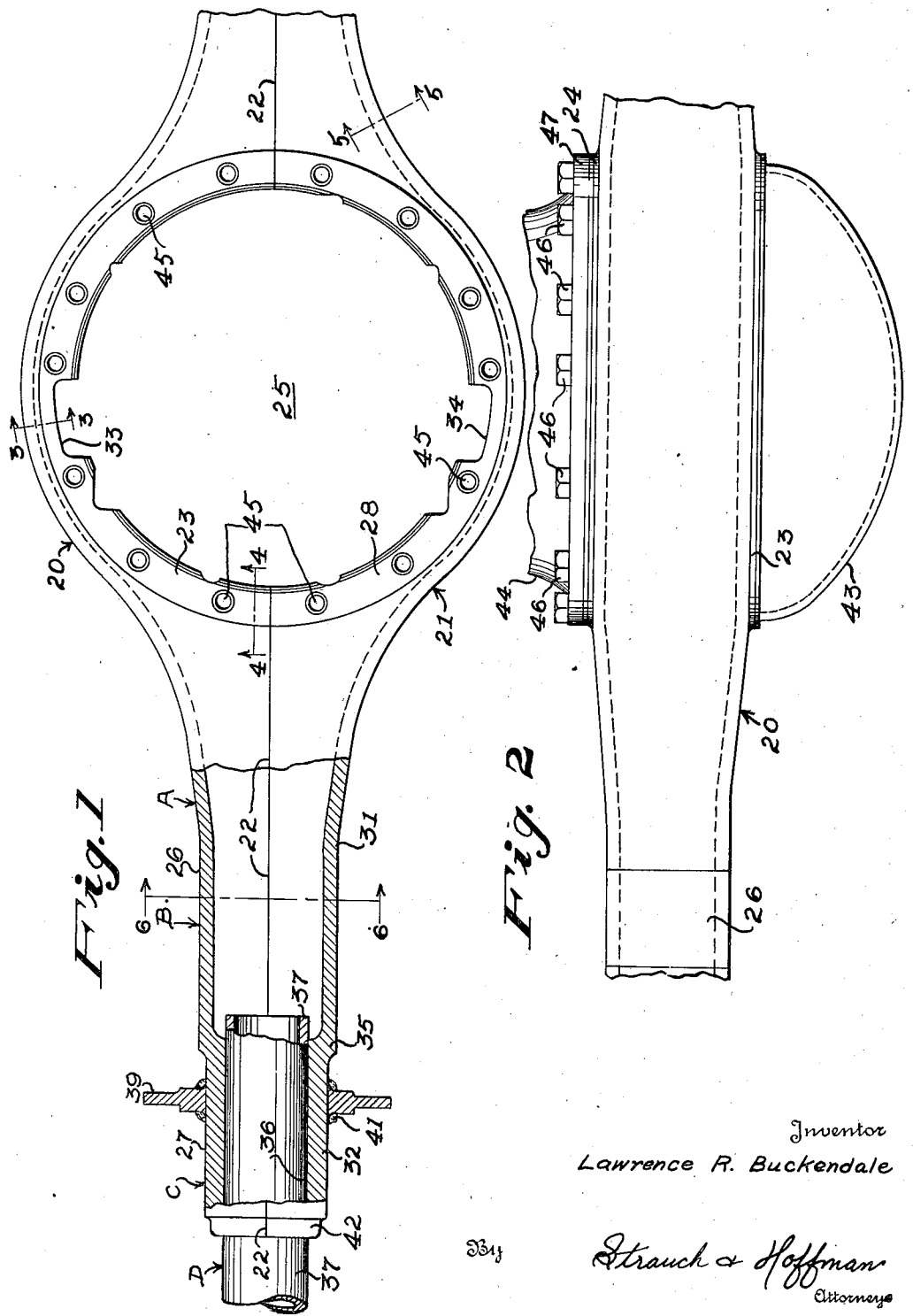
Inventor
Lawrence R. Buckendale
By Strauch & Hoffman
Attorneys

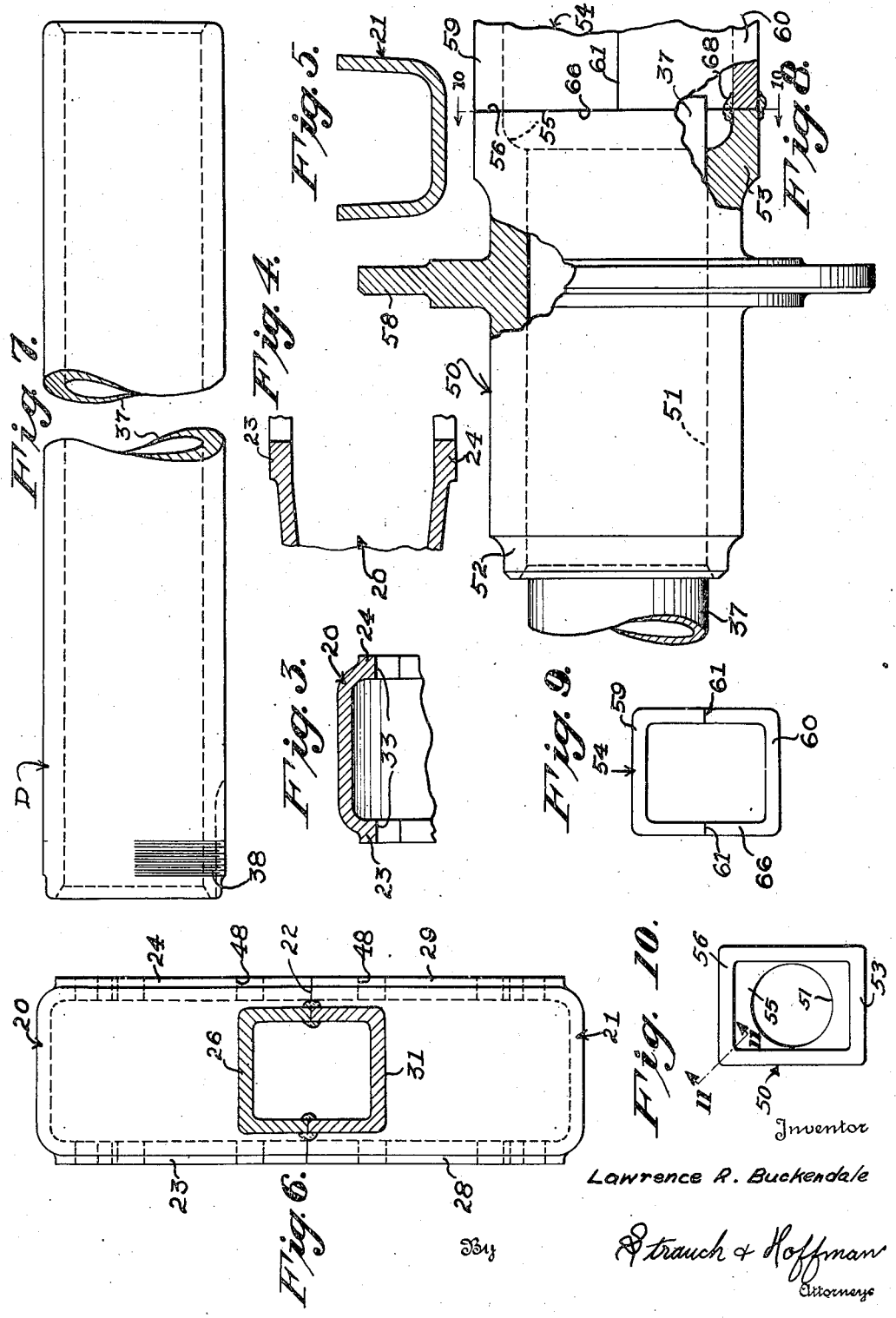

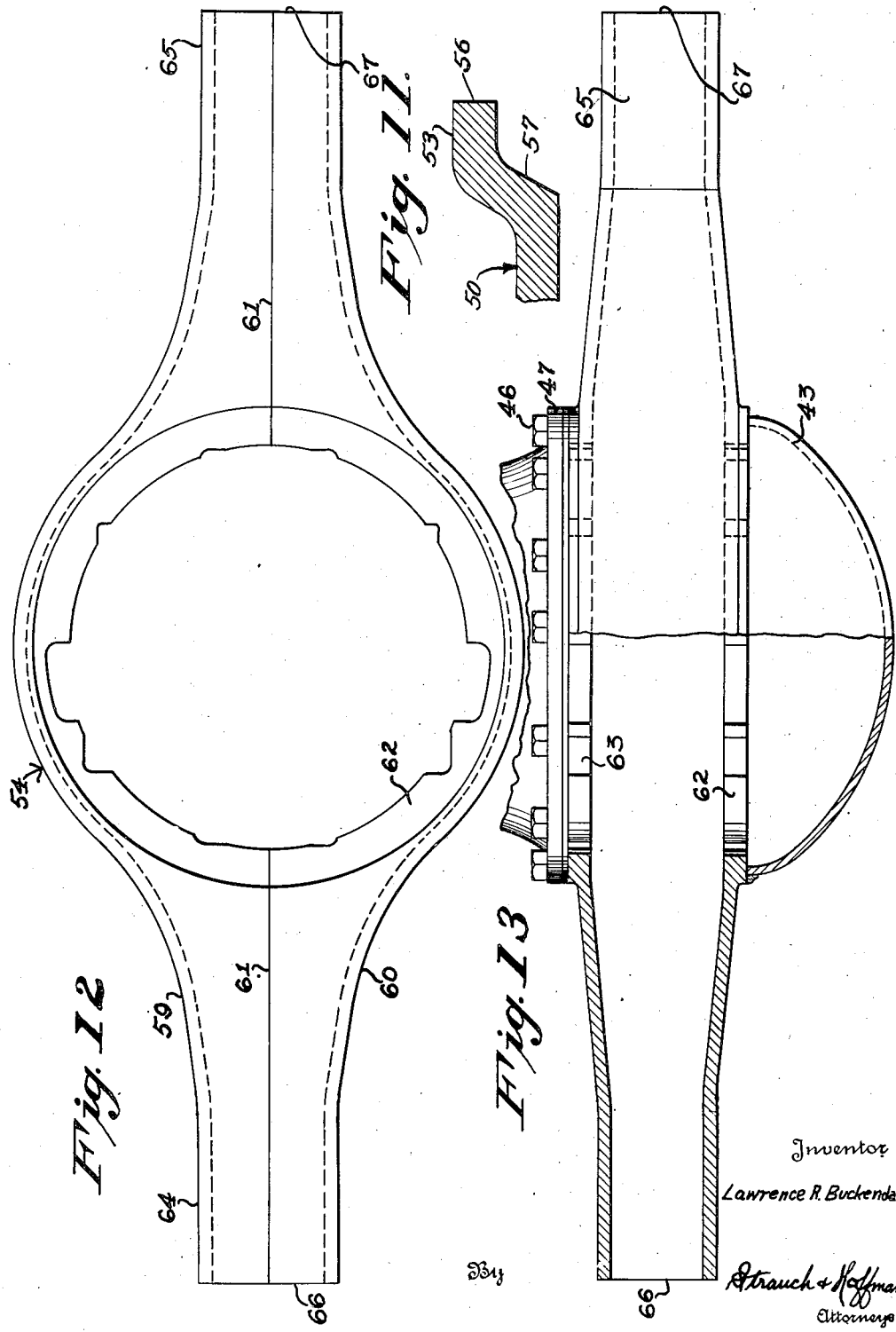

Patented Sept. 6, 1949

2,480,833

UNITED STATES PATENT OFFICE 2,480,833

AXLE HOUSING

Lawrence R. Buckendale, Detroit, Mich., assignor to The Timken-Detroit Axle Company, Detroit, Mich., a corporation of Ohio Application September 2, 1944, Serial No. 552,507

9 Claims. (Cl. 74—607)

This invention relates to improvements in axle housings, and has particular reference to axle housings formed to provide strengthened integral portions for attachment and mounting of associated parts.

The present invention is an improvement over the type of axle housing constructions disclosed in United States Letters Patents Nos. 1,108,114 to Alden and 2,204,287 to Wilber.

Housings of the above-identified type usually comprise opposed welded channel members previously stamped or pressed to provide an enlarged center portion surrounding a space for receiving differential gearings with integral substantially straight portions extending from either side of the center portion toward the respective wheels.

In such axle housings, it has been found necessary to secure reinforcing flange rings to housing flanges at opposite sides of the differential gear space for attachment of the differential bowl and the differential gear carrier. These reinforcement rings have usually been welded onto the housing, and were considered necessary because housing side flanges formed during the usual stamping or pressing operations were too weak for bolting or otherwise attaching the differential gear carrier or the differential bowl.

These welded-on flange ring reinforcements have given considerable trouble in actual practice, primarily I have discovered because they are not secured to the adjacent housing flanges uniformly throughout their entire extent. As a result, localized stresses develop causing fractures or other defects in the regions where attachment of the flange ring to the housing is weakest, resulting in axle housing failures and consequent more serious injury to the live axle parts carried thereby. Welding these flange rings to the housing represents the best known manner of attempting to obtain the desired uniform attachment, but I have discovered that even these welding operations do not reliably provide the optimum bond between the flange ring and housing, although welding is more satisfactory than bolting, riveting and the like.

The present invention contemplates elimination of this difficulty by forming the axle housing center section with relatively thick integral side flanges which contain sufficient metal and are of sufficient rigidity and strength to enable the differential bowl and the differential gear carrier to be bolted or welded directly thereto, and this is a primary object of the present invention.

Also, in this type of axle housing, difficulty has been experienced in obtaining reliable support for the wheel bearing sleeves. Wilber, above-mentioned, formed his wheel bearing sleeves integral with separate housing end sections which were butt-welded to the ends of the center section of of the axle housing. While this arrangement has been found satisfactory for many purposes, the present invention contemplates what I feel to be an improvement in this respect by forming thick, sturdy housing sleeves bosses intergral with, or suitably fixedly secured to, the opposite ends of the axle housing center section, these housing sleeve bosses being of sufficient rigidity and strength and of sufficient axial extent to provide unit support for the overhanging wheel bearing sleeves shrunk or otherwise fitted thereinto; and this is a further major object of my invention.

The above and other phases of the invention will be explicitly described in the forthcoming specification wherein several embodiments of the invention which are particularly adapted to commercial building or axle housings of this type will be herein described and claimed.

It is a further important object of the invention therefore to provide a novel forged axle housing having a combination of thickened integral side flanges at the center section for supporting a differential gear carrier and a differential bowl and having thickened bosses providing unit supports for wheel bearing sleeves.

It is a further object of the present invention to provide a novel axle housing which is an integral structure insofar as practical manufacturing considerations permit.

A further object resides in the provision of a novel forged axle housing in which the minimum practical amount of fabrication by welding is employed.

A still further object resides in the provision of an improved forged axle housing, the center section of which has novel integrally thickened or stoved-up side flanges.

A further object of the invention is to provide an improved axle housing having novel integral stoved-up spring seat portions of adequate area for attachment of the springs.

An additional object resides in the provision of an improved forged axle housing having wheel bearing sleeves mounted in special sturdy housing sleeve bosses at the ends of the housing center section.

Another object resides in the provision of a novel axle housing having thickened housing sleeve bosses integrally forged at the housing center section ends.

Yet another object resides in the provision of an improved axle housing having housing sleeve bosses integrally forged at the housing center section ends in which the rectangular cross section of the center section is reduced to the circular cross section of the sleeve boss in an improved manner.

It is also an object of the invention to provide an improved axle housing having a center section provided with bolting or attachment flanges and spring seats, housing sleeve boss portions and wheel bearing sleeve portions in which the maximum number of such portions are integrally formed from the minimum practical number of preliminary blanks by suitable machine forging operations.

A further object of the invention is to provide an improved machine forged axle housing having a thickened end boss for receiving a wheel bearing spindle or sleeve, said boss providing a unit support for said sleeve sufficient for adequate support thereof by reason of said forged construction. Pursuant to this object the boss may be integral with the axle housing or fixed thereto.

Another object resides in the provision of an improved axle housing in which a heavy, rigid strong integral side flange is provided for the support of a differential carrier.

Other objects and advantages will be apparent from the following description and appended claims in connection with the accompanying drawings in which:

Figure 1 is a side elevational view partly in section of a portion of an axle housing constructed according to a preferred embodiment of the invention;

Figure 2 is a partial top plan view of part of the axle housing of Figure 1, with the differential bowl and differential carrier attached;

Figure 3 is a sectional view on the line 3—3 of Figure 1 illustrating the housing shape at a part formed to accommodate insertion of the differential gearing;

Figure 4 is a cross sectional view on line 4—4 of Figure 1 illustrating the integral thickened housing flange of the axle of Figure 1;

Figure 5 is a partial sectional view on line 5—5 of Figure 1 illustrating the axle housing contour having gradually curved corners intermediate the housing flange and the spring seat portion shown in Figure 6;

Figure 6 is an end view substantially along line 6—6 of Figure 1 and especially illustrating the axle housing shape at the integral spring seat portions;

Figure 7 is a side elevation of a wheel bearing sleeve for use in the axle housing of Figure 1;

Figure 8 is an elevation partly in section of a portion of an axle housing constructed according to a further embodiment of the invention;

Figure 9 is an end view of the center section of the axle housing of Figures 8 and 12;

Figure 10 is an end elevational view of a separate housing sleeve boss adapted to be secured to an axle housing center section as illustrated in Figure 8;

Figure 11 is a section on line 11—11 in Figure 10;

Figure 12 is a side elevation of the center section of an axle housing of the type illustrated in Figure 8; and Figure 13 is a partial top plan view of the axle housing center section of Figure 12, partly broken away in section, and having the differential bowl and gear carrier attached thereto.

A preferred embodiment of the invention is illustrated in Figures 1–7 wherein the axle housing essentially comprises a center section A, spring seat portions B and housing sleeve bosses C. Wheel bearing sleeves D are mounted in the housing sleeve bosses and project therefrom.

In this embodiment of the invention, bosses C are integrally formed with housing center section A, the originally substantially rectangular contour of the housing center section being formed into the necessary circular cross section at the bosses by suitable forging operations.

Preferably also in this embodiment of the invention, the axle housing is made from two blanks specially formed to provide upper and lower housing members 20 and 21 of steel which are substantially of the same size and mirror images of each other and are joined along their contacting side wall edges by butt welding, the line of weld being indicated at 22 in Figure 1.

Upper housing member 20 is integrally formed with thickened opposite side flanges 23 and 24 surrounding the upper half of the enlarged differential gear space opening indicated at 25 as illustrated in Figures 1, 2, 3 and 4, special integral spring seat regions at 26 having maximum flat surface available for attachment of spring members, and terminates at opposite ends in integral thickened half-cylindrical housing sleeve boss portions 27. Since only one end of the housing is illustrated in Figure 1, only one spring seat region 26 and one integral housing sleeve boss 27 is therein shown, but it will be understood that both sides of the axle housing are the same in this respect.

Lower housing member 21 is similarly formed with opposite integral thickened side flanges 28 and 29 surrounding the lower half of the differential space opening 25 and flat spring seat regions 31, and terminating at opposite ends in integral thickened half-cylindrical housing sleeve bosses 32.

As illustrated in Figures 1 and 3, the thickened side flanges about opening 25 may have small portions, indicated at 33 and 34, removed for accommodating insertion of the drive axle gearing into the housing and like purposes, but these small areas of removed metal are not of sufficient extent to affect the overall strength of the flanges.

Each housing member, which has a somewhat rounded corner rectangular cross-section at its bowed mid-point portion and in the portions between the bowed portion and the spring seat regions by reason of the preliminary stamping or pressing operation forming the bowed center section, is suitably rendered more nearly rectangular in cross-section at the spring seat regions to provide the required flat spring seat area. The somewhat rounded corner contour of the housing member illustrated in Figure 5 is converted to the relatively sharp cornered spring seat contour illustrated best in Figure 6 by suitable forming operations to be described.

In turn, the rectangular housing contour outwardly of the spring seats B is suitably converted to the cylindrical housing sleeve boss formations at C. It will be noted that the wall thickness at the spring seat portions is about the same as the thickness of the housing walls therebetween, except the side flanges. Also the cylindrical walls of the housing sleeve bosses are considerably thicker than the remaining housing walls, except the side flanges which are of about the same thickness preferably. The irregular cross-section housing portions indicated at 35 between the spring seats and end bosses are of gradually reduced external size and gradually increased wall thickness outwardly merging into the bosses. A preferred forming operation for obtaining this integral thickened boss formation will be later described herein.

The upper and lower housing members, with their bowed center portions, flat spring seats and thickened end bosses formed thereon, are assembled and welded together along line 22 to provide a permanently bonded axle housing wherein opening 25 is surrounded at opposite ends by fully circular flanges 23, 28 and 24, 29; and the part cylindrical end bosses 27 and 32 cooperate to provide uninterrupted cylindrical bores 36 at each end of the housing.

Wheel bearing sleeves, which in the preferred embodiment are relatively short hollow steel cylindrical tubular sleeves 37 each having a threaded outer area 38 for receiving a bearing securing nut, are fixed in bores 36 against both rotation and axial displacement. As illustrated in Figure 1, the inner end of each sleeve 37 terminates substantially at or just beyond the inner end of its bore 36, so that the wheel bearing sleeves have but short unit support on the axle housing. This is a considerable improvement and saving in the length of wheel bearing sleeves which in prior constructions it was considered necessary to extend much further into the axle housing for additional lateral support within the housing. I attribute this unexpected efficiency of my improved construction to the overall combination of the short sleeve with the relatively heavy surrounding end boss and associated housing construction.

In practice, I have discovered that the length of the bore 36 supporting sleeve 37 should be substantially equal to the sleeve length projecting and overhanging from the housing end for best service. For example, in a commercial embodiment of the invention, I employ a wheel bearing sleeve of about three and one quarter inches outside diameter and seven-sixteenths inch thick and about eighteen inches long, fixedly supported uniformly over about nine inches of its length by surrounding bore 36, the wall thickness of bore 36 being about three-fourths inch. These relations and relative dimensions hold whether the housing sleeve boss is integral with the center section of the housing as in Figures 1–7, or a separate member welded thereto as in Figure 8 later to be described.

Brake adapter flanges 39 fit snugly over the exterior of bosses C and are welded thereto in proper location as indicated at 41. Each flange 39 is preferably an integral annular member which functions to hold the upper and lower housing members together against tendency for separation on weld line 22. These integral brake adapter rings therefore materially increase the overall strength of my axle housing in this embodiment of the invention.

Each cylindrical housing sleeve boss terminates in a reduced annular shoulder indicated at 42 which is preferably machined out of the boss after tht two housing members have been welded together. Shoulder 42 provides a seat for a suitable wheel bearing retaining element (not shown). The outer corner of each shoulder 42 is rounded off as illustrated for safety in handling.

As illustrated in Figure 2, a differential bowl 43 and a differential gear carrier 44 are fixed to opposite sides of the housing center section. In practice, bowl 43 may be bolted to housing side flange 23, 28, as by suitable bolts (not shown) passing into threaded apertures such as 45 in the flange, but preferably bowl 43 is welded to flange 23, 28 since it is normally not removed during service, in which latter circumstance apertures 45 would not be necessary.

However, since gear carrier 44 must be removable in service, it is bolted to flange 24, 29, a series of bolts 46 passing through a carrier flange 47 mated with flange 24, 29, and the latter being provided with suitable threaded bolt receiving apertures 48 as shown in Figure 6.

According to an important phase of the invention, flanges 23, 28 and 24, 29, or at least carrier support flange 24, 29 which has a load bolted thereto, are of sufficient width, thickness and metal content as to accommodate the required number of threaded bolt receiving apertures and at the same time remain sufficiently rigid to withstand the loads and stresses normally encountered at these parts of the axle housing. I have found, for example, that in an ordinary small truck axle housing formed from about one-half inch sheet or channeled stock, a flange width of about one and one-half inches and a flange thickness of slightly over three-fourths inch is satisfactory for securing a standard differential gear carrier thereto with three-fourths inch bolts.

My thickened axle housing side flanges are integral with the housing so that prior problems of non-uniformly distributed attachment stresses are eliminated, and are equivalently self-rigid and sturdy with the optimum sought to be obtained in heretofore reinforced flange housings above described. No added flange reinforcement is needed for normal service. My novel axle housing construction is in this respect also much less expensive than prior reinforced housings since the time, equipment and labor of welding operations are eliminated and replaced by special forming operations which can be correlated closely to the preliminary forming operations.

In fabricating the axle housing of Figures 1–7, each housing member is made from a sheet steel blank of about three-sixteenths to one-half inch in thickness.

Starting with a flat blank of sheet metal of the required length and containing the required amount of excess metal, the blank is first formed into a channel section substantially of the shape ilustrated in Figure 5. At this intermediate stage, the blank has excess metal at its end portions and has excess metal at its center portion, the excess metal being mainly in the side walls of the channel section. Thus the blank used in the invention contains more metal in its channel side walls than a blank such as used in the above-mentioned Wilber and Alden patents for example. This original channel section has rounded corners best illustrated in Figure 5, curved on concentric arcs of which the inner arc has a radius not less than the thickness of the material in accordance with standard forging practice.

A further operation deforms the center or intermediate portion of the blank, bowing it outwardly to the arcuate shape shown in Figure 1 to provide one half of the differential opening 25 in the side walls of the blank. Either during this operation, or during subsequent and associated forging operations, the excess metal on the side walls of the center section of the blank is forced or swedged inwardly by suitable forging dies until housing side flanges containing excess metal are formed. Then, by a suitable stoving-up operation, the sectional shape of the blank at the spring seat region is changed from that illustrated in Figure 5 to that illustrated in Figure 6, in which the corners of the channel section are substantially square, a very small radius being permitted to avoid over straining or cracking of the material at the corners. This condition extends longitudinally for a distance somewhat greater than the width of the springs which are to be mounted on the axle housing and provides flat spring seats of the required area as indicated at 26 and 31, which are directly available for mounting the springs. It has previously been considered necessary to weld pads or plates onto the axle housing in order to provide a sufficient area for the spring seats to keep the axle housing from twisting or turning in the U-bolts or other connections which secure it to the springs. With this improved construction, the surface area of each axle housing itself is made of sufficient width and area to provide an adequate spring seat, and the springs may be clamped directly to the housing by the conventional U-bolts and apertured plates or other desired means. By providing some excess metal at the spring seat regions of the blank and swedging it down to form substantially square cornered thickened and reinforced housing portions, the necessity of providing separately forged or shaped spring seat plates and hand welding them to the housing is avoided and the spring seats are permanently disposed in exactly the right location.

The housing side walls of the bowed intermediate portion of the blank, and the excess metal therein provided are also swedged down by suitable forging action to form thickened integral housing side flanges of the required thickness and other dimensions surrounding the corresponding portions of the differential opening 25. As most clearly shown in Figure 4, in this operation the excess metal forms externally projecting flanges on the side walls of the housing sections, the bolting faces of which may be accurately finished to lie in planes which are exactly parallel with the longitudinal axis of the housing. Thus the differential gear carrier may be quickly mounted on the flanges 24 and 29, and correctly centered with respect to the axle housing. This operation may be continuous with or subsequent to formation of the housing side flanges. In at least some cases as above indicated, it may be necessary to provide notches as indicated at 33 and 34 in these reinforcing rings or flanges in order to permit insertion of the differential gear mechanism into opening 25. The thickened rings or flanges however are made of such size that sufficient material remains even at the notched portions to provide adequate strength and rigidity for the structure. Preferably, after the housing center section and spring seat regions have been formed, the blank is suitably formed to reduce it to the required length and convert the excess metal into the required thickened end bosses. This is done by suitable forging operations which convert the rectangular blank cross-section at the blank ends into the required half-circular cross-section while at the same time holding the blank against longitudinal movement and swedging its ends inwardly until the required wall thickness and shape is obtained in the bosses.

After members 26 and 31 have been welded together, wheel bearing sleeves D are inserted the proper distance and non-rotatably secured within bores 36, preferably by packing the sleeves in Dry Ice prior to insertion and letting them normalize and expand into tight gripping contact with the walls of bores 36.

While the above described axle housing is preferably made from two similar blanks, it is within the scope of the invention to make it from any desired number of similar blanks which may be welded along contacting longitudinal faces as at 22.

In some axle assemblies it may be desirable to make the two housing sleeve bosses as separate units and butt-weld them to the opposite ends of the assembled center section, as will be disclosed in the further embodiment of the invention illustrated in Figures 8–13.

Each such housing sleeve boss unit, generally indicated at 50 in Figure 8, is an integral hollow cylindrical member formed with a truly cylindrical through bore 51 and provided at its outer end with an external annular shoulder 52 which relieves the sharp edge that would otherwise be present and also provides a seat for a suitable wheel bearing retaining element (not illustrated). At its inner end, each boss is converted from a circular cross-section to the substantially rectangular cross-sectional illustrated in Figure 10 to provide an end region 53 that corresponds in cross-section, size and wall thickness to the end of housing center section 54 to which it is to be welded and which is illustrated in Figure 9.

In shaping region 53 of the boss unit, the hollow cylindrical tube comprising the boss is preferably upset and externally reshaped at its inner end by suitable forging operations until region 53 comprises a thickened wall section having the required external shape and size. Then excess metal is removed out of the thickened end of the tube as indicated at 55 until the latter presents the substantially rectangular contour of Figure 10 matching the adjacent end of center section in size, shape and wall thickness. The inner end face 56 of boss unit 50 is machined flat in a plane at right angles to the axis of the boss.

As illustrated in Figure 11, care is taken during this operation that the wall thickness in the intermediately shaped section 57 between the cylindrical part of boss 50 and region 53 is at least equal to the wall thickness of the remainder of boss 50, and preferably the slope of wall 57 should not be more than sixty degrees to the axis of the boss for optimum strength.

Boss unit 50 is provided with a brake adapter flange 58 which may be integral therewith as illustrated in Figure 8, or a separate element welded thereto as in Figure 1.

Housing center section 54 is preferably composed of two similar housing members 59 and 60, which are joined by welding along line 61 corresponding to line 22 in Figure 1. The integral thick housing side flanges 62 and 63 are preferably formed on housing members 59 and 60 in the same manner that flanges 23, 28 and 24, 29 are formed on the housing members in Figure 1. Similarly the end regions 64 and 65 of housing center section 54 are formed in housing members 59 and 60 to the substantially rectangular contour illustrated. Figure 9 is made by forming operations as in members 20 and 21 of Figure 1. End regions 64 and 65 are of sufficient longitudinal extent and flat area to provide spring seats similar to seats 26, 31 in Figure 1.

Thus, in general, center section 54 of Figures 12 and 13 is the same in structure and method of construction as the axle housing of Figure 1, except for the housing sleeve bosses of the latter.

In making the axle housing of Figures 8–13, after the two housing members 59 and 60 have been formed to provide their integral thickened flange portions surrounding the differential opening and integral stoved-up spring seat portions, they are positioned in assembled relation, as illustrated in Figure 12, and their contacting edge portions permanently welded together along line 61.

The opposite end faces 66 and 67 of center section 54 are machined smooth and in planes perpendicular to the longitudinal center line of the housing. Then a housing sleeve boss unit 50 is permanently welded to each end of the center section, faces 56 and 66 (or 67) being matched together and then joined by a butt-welded, as at 68 in Figure 8. A wheel bearing sleeve 37 is then suitably secured within each boss as in Figure 1 to constitute the complete axle housing.

Although it has been found desirable from considerations of present manufacturing equipment, to form the housing center section in two similar parts and unite these parts by welding along adjoining edges as above described, it is within the scope of the invention to form housing center section 54 from a single tubular blank. The blank would be longitudinally split at its center portion and expanded by suitable dies to provide the differential space and forged to provide the required thickened flanges about the opening at each side thereof. The ends of the blank would be suitably formed to the proper cross-sectional shape for the spring seats, and the housing sleeve bosses 50 welded to the ends thereof. This construction will eliminate the longitudinal welds along the plane of the line 61 and provide an integral center section with integral reinforcing flanges around the differential openings and integral spring seat portions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are thereof intended to be embraced therein.

What is claimed and desired to be secured by United States Letters Patent is:

1. A metal axle housing member comprising a central arcuate body section and sections extending laterally in opposite directions from said body section, each of said laterally extending sections being of general rectangular form in cross-section and including a forged spring seat portion having substantially square corner regions of greater thickness than the angularly related walls thereof and containing metal displaced thereinto during said forging, and each said laterally extending section also including an intermediate connecting portion between said body section and the spring seat portion having walls and rounded corners of substantially uniform thickness.

2. A hollow axle housing comprising two longitudinally similar channel members permanently bonded together along longitudinally coextensive edges, each of said members comprising end portions joined by a bowed center portion spanning a drive mechanism receiving space, with the walls of said members along the edges of said bowed portions thickened to provide strong integral attachment flanges, said end portions each having outer end regions forged into substantially rectangular cross-section with substantially square corners that are thicker than the adjacent housing walls and said outer end regions serving as spring attachment seats, and said spring seat regions being integrally joined to said bowed portions by intermediate regions having walls and rounded corners of substantially uniform thickness.

3. A hollow axle structure comprising two longitudinally similar channel members permanently bonded together along longitudinally coextensive edges, each of said members comprising end portions joined by a center portion, said end portions each having outer regions formed into substantially rectangular cross-section with substantially square corners that are thicker than the adjacent walls and said outer regions serving as spring attachment seats, and said spring seat regions being integrally joined to said center portions by transition regions merging from said spring seat region walls to walls and rounded corners of substantially uniform thickness.

4. The axle structure defined in claim 3, wherein each of said end portions of said channel members terminates outwardly in an integral semi-cylindrical boss.

5. An axle structure comprising a hollow member having end portions of substantially rectangular cross section and a central portion connected by transition regions to said end portions, each of said end portions including a spring seat region having substantially square corners providing a flat spring attachment area with said corners being materially thicker than the adjacent walls of said member, and said transition regions merging from said substantially rectangular square cornered cross section into a substantially rectangular section with rounded corners and walls of substantially uniform thickness.

6. The axle structure defined in claim 5 wherein the end portions of said hollow member are formed outwardly of said spring seat regions with integral substantially cylindrical bosses.

7. A metal axle housing member comprising a central arcuate body section and sections extending laterally in opposite directions from said body section, each of said laterally extending sections being of general rectangular form in cross-section and including a forged spring seat portion having substantially square corner regions of greater thickness than the angularly related walls thereof and containing metal displaced thereinto during said forging, and each said laterally extending section including a semi-cylindrical bearing receiving terminal portion having a wall thickness exceeding the thickness of the walls of said spring seat portion and integrally merged therewith.

8. An axle member comprising a central body section of general rectangular form in cross-section and provided with an outer spring seat portion having substantially square corner regions of greater thickness than the angularly related walls thereof, said central body section including a connecting transition portion between said central body section and the spring seat portion having walls and rounded corners of substantially uniform thickness.

9. An axle member comprising a central body section of general rectangular form in cross-section and provided with spring seat portions having substantially square corner regions of greater thickness than the angularly related walls thereof, said central body section including cylindrical bearing receiving terminal portions each having a wall thickness exceeding the thickness of the walls of the adjacent spring seat portion and integrally merged therewith.

LAWRENCE R. BUCKENDALE.

REFERENCES CITED

The following references are of record in the file of this patent:

UNITED STATES PATENTS

| Number | Name | Date |
|---|---|---|
| 1,007,260 | Alden | Oct. 31, 1911 |
| 1,209,134 | Dodge | Dec. 19, 1916 |
| 1,403,500 | Huff | Jan. 17, 1922 |
| 1,643,225 | Smith | Sept. 20, 1927 |
| 1,689,989 | Williams | Oct. 30, 1928 |
| 1,880,305 | Williams | Oct. 4, 1932 |
| 1,945,076 | Riemenschneider | Jan. 30, 1934 |
| 2,124,406 | Spatta | July 19, 1938 |
| 2,204,287 | Wilber | June 11, 1940 |
| 2,370,641 | Dewey | Mar. 6, 1945 |

FOREIGN PATENTS

| Number | Country | Date |
|---|---|---|
| 603,468 | France | Apr. 16, 1926 |